United States Patent Office 2,726,946
Patented Dec. 13, 1955

2,726,946

METHOD AND COMPOSITION FOR THE CONTROL OF UNDESIRABLE VEGETATION

Dorsey R. Mussell, Clare, Mich., assignor to The Dow Chemical Company, Midland, Mich., a corporation of Delaware No Drawing. Application April 26, 1954,
Serial No. 425,711

9 Claims. (Cl. 71—2.3)

This invention is concerned with the suppression of the growth of undesirable vegetation and is particularly directed to a composition and method for the suppression of the growth of the germinant seeds and emerging seedlings of many undesirable weed species.

In recent years the use of chemical materials for the control of the growth of vegetation has found widespread acceptance amongst agriculturists. However, the practice of such chemical control has brought into focus shortcomings in commonly employed procedures. Thus, the herbicide chemicals currently used are sometimes as toxic to established plants as they are to seeds. Also, it has generally not been possible to obtain a selective control of the growth of undesirable seeds and emerging seedlings in soil which is planted with the seeds of desirable crop plants or supporting the growth of well established plants, plants past the seedling state of growth. Further, the selective control of weeds in established crop plants is oftentimes carried out at a time when the weeds have already depleted the soil of moisture and nutrients.

It is an object of the present invention to provide a new method for the suppression and control of the growth of undesirable vegetation. A further object is to provide a method for the suppression of the growth of undesirable seeds and emerging seedlings, and particularly those of grasses, in soil or other growth media which is planted with the seeds of broadleaf crop plants or supporting the growth of established plants. Another object is the provision of a novel composition adapted to be employed for the accomplishment of the new method of growth control. Other objects will become apparent from the following specification and claims.

According to the present invention, it has been discovered that the growth of many germinant seeds and emerging seedlings, and particularly those of grasses, may be suppressed by exposing the germinant seeds and emerging seedling rootlets to the action of 4-chloro-2-nitrophenyl 4-chlorophenyl ether. This compound is a crystalline solid material melting at 77°–79° C. The compound is somewhat soluble in many organic solvents and of very low solubility in water. It appears to have a high toxicity against the germinant seeds and emerging seedlings of many grass species. Thus, it may be employed for the selective control of the germinant seeds and emerging seedlings of grasses in growth media planted with many species of broadleaf crop plants or supporting the growth of such plants. Further, the ether compound has a high degree of persistency in soil and gives excellent controls of grasses for periods ranging up to several months.

The introduction of 4-chloro-2-nitrophenyl 4-chlorophenyl ether into soil or growth media gives rise to varying degrees of response in germinant seeds, emerging seedlings and growing plants depending upon the nature of the seeds or plant and the dosage dispersed in the growth media, as well as the weather conditions of temperature and moisture. When very large dosages are dispersed in growth media, a temporary inhibition of seeds, seedlings and established plants is obtained. This approaches a sterilizing action. The weathering action of the sun and rain, and possibly the decomposition of the toxic compound by the action of bacteria and other soil organisms eventually frees the growth media of the toxicant. In more dilute dosages the 4-chloro-2-nitrophenyl 4-chlorophenyl ether compound suppresses the growth of the seeds and emerging seedlings of many grass species while having little or no effect upon the seeds and emerging seedlings of many broadleaf plants or upon the established plants of such broadleaf species. Thus, it is possible to effect a selective treatment of mixed seedlings of grasses and broadleaf crop plants. Where established crop plants are concerned, no appreciable amounts of the ether compound should be applied to the plant foliage since the compound has a tendency to burn the foliage.

The distribution of a growth inhibiting amount of 4-chloro-2-nitrophenyl 4-chlorophenyl ether in soil is essential for the practice of the present invention. In non-selective applications to growth media, good results are obtained when a dosage of toxicant is supplied in the amount of from about 2 to 310 parts or more by weight per million parts by weight of the media. In applications to soil, good results are obtained when the ether compound is distributed at a rate of from about 1.5 pounds to 200 pounds or more per acre and through such a cross section of the soil as to provide for the presence therein of an effective concentration of the treating agent. In such applications, it is desirable that the compound be distributed to a depth of at least 0.25 inch and at a dosage of at least 0.5 pound per acre inch. In selective applications for the control of the germinant seeds and emerging seedlings of many undesirable weeds, and particularly those of grasses in areas planted with the seeds of many broadleaf crop plants or supporting the growth of such plants, a dosage of from 2 to 128 parts by weight of toxicant per million parts by weight of soil is desirable. In such applications, the exact dosage to be employed is dependent upon the resistance of the broadleaf crop plant or its seeds to the ether compound.

The method of the present invention may be carried out by applying to and mixing with growth media the unmodified 4-chloro-2-nitrophenyl 4-chlorophenyl ether. However, the present method also embraces the employment of a liquid or dust composition containing the toxicant. In such usage, the ether compound may be modified with one or a plurality of additaments including water or other liquid carriers, surface active dispersing agents and finely divided inert solids. Depending upon the concentration of toxicant, such augmented compositions are adapted to be distributed in the soil, or employed as concentrates and subsequently diluted with additional inert carrier to produce the ultimate treating compositions. The required amount of the ether compound in the growth media conveniently may be supplied per acre treated in from 40 to 27,000 gallons or more of the liquid carrier or in from about 50 to 2,000 pounds of the inert solid carrier.

The exact concentration of the ether compound to be employed in compositions for the treatment of growth media may vary provided the required dosage of effective agent is supplied. The concentration of toxicant in liquid compositions employed to supply the desired dosage generally is from about 0.01 to 50 or even up to 90 percent by weight. In dusts, the concentration of toxicant may be from about 1 to 20 percent by weight. In compositions to be employed as concentrates, the toxicant may be present in a concentration of from about 5 to 95 percent by weight.

Liquid compositions containing the desired amount of ether compound may be prepared by dissolving the toxicant in an organic liquid such as acetone or xylene, or by dispersing the toxicant in water with the aid of a suitable surface active dispersing agent such as an ionic or non-ionic emulsifying agent. The aqueous compositions may contain one or more water-immiscible solvents for the ether compound. In such compositions, the carrier comprises an aqueous emulsion, i. e. a mixture of water-immiscible solvent, emulsifying agent and water. The choice of dispersing and emulsifying agent and the amount thereof employed is dictated by the nature of the composition type and by the ability of the agent to facilitate the dispersion of the ether compound in the aqueous carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the 4-chloro-2-nitrophenyl 4-chlorophenyl ether is dispersed in and on a finely divided inert solid such as talc, chalk, gypsum and the like. In such operations, the carrier is mechanically ground with the ether compound or wet with a volatile organic solvent solution thereof. Similarly, dust compositions containing the ether compound may be prepared from various of the solid surface active dispersing agents, such as bentonite, fuller's earth, attapulgite and other clays. Depending upon the proportions of ingredients, these dust compositions may be employed as concentrates and subsequently diluted with additional solid surface active dispersing agent or with talc chalk or gypsum and the like to obtain the desired amount of active ingredient in a composition adapted to be applied for the control of the growth of vegetation. Also such concentrate dust compositions may be dispersed in water with or without the aid of a dispersing agent to form spray mixtures.

When operating in accordance with the present invention, growth inhibiting amounts of the ether compound or a composition containing the toxicant are dispersed in any convenient fashion in soil or other growth media, i. e. by simple mixing with the growth media, by applying to the surface of soil and thereafter dragging or discing into the soil to the desired depth, or by employing a liquid carrier to accomplish the penetration and impregnation. The application of the spray and dust compositions may be carried out by conventional methods, e. g. with power dusters, boom and hand sprayers and spray dusters.

In a further method, the distribution may be accomplished by introducing the toxicant in the water employed to irrigate the soil. In such procedure, the amount of water may be varied in accordance with the porosity and water holding capacity of the soil in order to obtain the desired depth of distribution of the toxicant.

The following examples illustrate the invention but are not to be construed as limiting the same:

Example 1

25 parts by weight of 4-chloro-2-nitrophenyl 4-chlorophenyl ether, 62 parts of fuller's earth, 10 parts of diatomaceous earth, 2 parts of an alkyl aryl sulfonate (Nacconal NR) and 1 part of a polymerized sodium salt of substituted benzoid alkyl sulfonic acids (Daxad No. 27) are mechanically mixed and ground together to prepare a concentrate composition in the form of a wettable powder.

Also, 25 parts by weight of 4-chloro-2-nitrophenyl 4-chlorophenyl ether, 65 parts of xylene and 10 parts of a dimeric alkylated aryl polyether alcohol (Triton X-155) are mechanically mixed together to prepare a liquid emulsifiable concentrate composition.

Example 2

In a similar manner, 6 parts by weight of 4-chloro-2-nitrophenyl 4-chlorophenyl ether, 0.1 part of Nacconal NR, 0.1 part of Daxad No. 27 and 200 parts of water are ball-milled together to prepare a concentrate composition in the form of a water dispersible liquid.

These concentrate compositions may be dispersed in water to prepare aqueous compositions which have very desirable wetting and penetrating properties. The latter aqueous compositions are adapted to be employed to treat soil and distribute 4-chloro-2-nitrophenyl 4-chlorophenyl ether therein in growth inhibiting concentrations.

Example 3

The emulsifiable concentrate composition of Example 1 was dispersed in water to prepare aqueous compositions containing 0.06, 0.12, 0.24, 0.48 and 0.96 pound of 4-chloro-2-nitrophenyl 4-chlorophenyl ether per 100 gallons of ultimate mixture. These aqueous compositions were employed for the treatment of soil and observations made of the control of the growth of the seeds and emerging seedlings of various grasses, broadleaf weeds and broadleaf crop plants. The grass type species included crab grass, timothy, millet, rye, oats, wild oats, wheat and onions and the broadleaf plants included buckwheat, flax, peas, radish, cotton, cucumber and soybean. In the determinations, the compositions were employed to treat soil areas which had been prepared and seeded with the named plant species. In the treating operations, the compositions were applied as a soil drench and at a rate of about 0.305 acre inch of composition per acre to supply substantially uniform dosages of 5, 10, 20, 40 and 80 pounds of 4-chloro-2-nitrophenyl 4-chlorophenyl ether per acre. These dosages correspond, respectively, to concentrations of about 8, 16, 32, 64 and 128 parts by weight of 4-chloro-2-nitrophenyl 4-chlorophenyl ether per million parts by weight of soil. Other areas similarly seeded with the named plant species were left untreated to serve as checks. After 3 weeks, the areas were examined to ascertain what control of the growth of seeds and emerging seedlings had been obtained. The results are set forth in the following table:

| Seed Species | Percent Control of Growth of Seeds and Emerging Seedlings at the Various Indicated Concentrations of Toxicant in the Treated Seed Beds | | | | |
|---|---|---|---|---|---|
| | 8 p. p. m. | 16 p. p. m. | 32 p. p. m. | 64 p. p. m. | 128 p. p. m. |
| crabgrass | 100 | 100 | 100 | 100 | 100 |
| timothy | 100 | 100 | 100 | 100 | 100 |
| millet | 95 | 95 | 95 | 95 | 98 |
| rye | 85 | 90 | 95 | 98 | 99 |
| oats | 70 | 85 | 90 | 95 | 99 |
| wild oats | 60 | 85 | 92 | 95 | 99 |
| wheat | 15 | 30 | 40 | 80 | 95 |
| corn | 5 | 5 | 15 | 40 | 50 |
| onions | 0 | 0 | 10 | 25 | 50 |
| buckwheat | 20 | 40 | 50 | 70 | 90 |
| flax | 0 | 0 | 0 | 0 | 0 |
| pea | 0 | 0 | 0 | 0 | 0 |
| radish | 0 | 0 | 0 | 0 | 0 |
| cotton | 0 | 0 | 0 | 0 | 0 |
| cucumber | 0 | 0 | 0 | 0 | 0 |
| soybean | 0 | 0 | 0 | 0 | 0 |

At the time of observation the check areas were found to show luxuriant and vigorously growing stands of the named plant species.

Example 4

The emulsifiable concentrate composition of Example 1 was dispersed in water to prepare aqueous compositions containing 0.12, 0.24, 0.48 and 0.96 pound of 4-chloro-2-nitrophenyl 4-chlorophenyl ether per 100 gallons of ultimate mixture. These compositions were employed for the treatment of soil and observations made of the control of the growth of the seeds and emerging seedlings of grass species such as crabgrass, witch grass, foxtail, blue grass, redtop, fescue and bent grass, and of the broadleaf plant species such as pigweed, navy bean, carrot, turnip and cabbage. In such operations, the compositions were employed to treat soil areas which had been prepared and seeded with the named plant species. In the treating operations, the compositions were applied to the areas as a soil drench and at a rate 0.305 acre inch of aqueous composition per acre to supply substantially uniform dosages of 10, 20, 40 and 80 pounds of 4-chloro-2-nitrophenyl 4-chlorophenyl ether per acre. These dosages correspond, respectively, to concentrations of about 16, 32, 64 and 128 parts by weight of 4-chloro-2-nitrophenyl 4-chlorophenyl ether per million parts by weight of soil. Other areas similarly prepared and seeded with the named plant species were left untreated to serve as checks.

After 32 days the areas were examined to ascertain what control of the growth of seeds and emerging seedlings had been obtained. The results are set forth in the following table:

| Seed Species | Percent Control of Growth of Seeds and Emerging Seedlings at the Various Indicated Concentrations of Toxicant in the Treated Seed Beds | | | |
|---|---|---|---|---|
| | 16 p. p. m. | 32 p. p. m. | 64 p. p. m. | 128 p. p. m. |
| crabgrass | 100 | 100 | 100 | 100 |
| witch grass | 98 | 100 | 100 | 100 |
| foxtail | 98 | 100 | 100 | 100 |
| blue grass | 100 | 100 | 100 | 100 |
| redtop grass | 100 | 100 | 100 | 100 |
| fescue grass | 95 | 100 | 100 | 100 |
| bentgrass | 100 | 100 | 100 | 100 |
| pigweed | 100 | 100 | 100 | 100 |
| navy bean | 0 | 0 | 0 | 20 |
| carrot | 0 | 0 | 0 | 0 |
| turnip | 0 | 0 | 50 | 75 |
| cabbage | 0 | 0 | 0 | 15 |

Substantially complete germination of all weed and plant species was found in the check areas.

*Example 5*

The emulsifiable concentrate composition of Example 1 was dispersed in water to prepare aqueous compositions containing 0.04 to 0.4 pound of 4-chloro-2-nitrophenyl 4-chlorophenyl ether per 100 gallons of ultimate mixture. These compositions were employed for the control of the growth of the seeds and emerging seedlings of millet and wild oats. In such operations, the compositions were employed to treat soil areas which had been prepared and seeded with the named plant species. In the treating operations, the compositions were applied to the areas as a soil drench and at a rate of about 0.44 acre inch of aqueous composition to supply substantially uniform dosages of about 5 and 50 pounds of 4-chloro-2-nitrophenyl 4-chlorophenyl ether per acre. These dosages correspond, respectively, to concentrations of about 8.2 and 82 parts by weight of 4-chloro-2-nitrophenyl 4-chlorophenyl ether per million parts by weight of soil. Other areas similarly prepared and seeded with the named plant species were left untreated to serve as checks.

After three weeks, the treated areas were examined to ascertain what control of the growth of seeds and emerging seedlings had been obtained. The results are set forth in the following table:

| Seed Species | Percent Control of Growth of Seeds and Emerging Seedlings at the Indicated Concentrations of Toxicant in the Treated Seed Beds | |
|---|---|---|
| | 8.2 p. p. m. | 82.0 p. p. m. |
| millet | 90 | 99 |
| wild oats | 50 | 100 |

At the time of observation, the check areas were found to support vigorously growing stands of millet and wild oats.

*Example 6*

Sandy loam soil of good nutrient content was spread in flats to a depth of about three inches and the soil in the flats thereafter treated with aqueous compositions containing 0.06, 0.12, 0.24 and 0.36 pound of 4-chloro-2-nitrophenyl 4-chlorophenyl ether per 100 gallons of ultimate mixture. The employed aqueous compositions were prepared from the emulsifiable concentrate composition of Example 1. In the treating operations, the compositions were applied to the soil in the flats as a soil drench and at a rate of 0.305 acre inch of aqueous composition per acre to supply relatively uniform dosages of 5, 10, 20 and 30 pounds of 4-chloro-2-nitrophenyl 4-chlorophenyl ether per acre. These dosages correspond, respectively, to 8, 16, 32 and 48 parts by weight of 4-chloro-2-nitrophenyl 4-chlorophenyl ether per million parts by weight of soil. The treated flats and untreated check flats were then subjected to greenhouse conditions of light and humidity and watered in an amount corresponding to ¼ inch of rainfall per day.

Twenty-two days later the treated and check flats were planted with the germinative seeds of wild oats, timothy, and millet. Eleven days after seeding, the treated flats were examined to ascertain what effect the delayed planting had upon germination and subsequent growth of the named grass species. The results are set forth in the following table:

| Seed Species | Percent Control of Growth of Seeds and Emerging Seedlings in the Soil Previously Treated at the Various Indicated Concentrations of Toxicant | | | |
|---|---|---|---|---|
| | 8 p. p. m. | 16 p. p. m. | 32 p. p. m. | 48 p. p. m. |
| wild oats | 30 | 50 | 70 | 90 |
| timothy | 50 | 80 | 90 | 95 |
| millet | 20 | 45 | 70 | 90 |

At the time of observation, substantially complete germination of all grass species was found in the check flats.

The expression "growth media" is employed in the present specification and claims in its broadest sense to be inclusive of all conventional "soils," as defined in Webster's New International Dictionary, Second Edition, Unabridged, published in 1937 by G. and C. Merriam Company, Springfield, Massachusetts. Thus, the term refers to any substances or media in which vegetation may take root and grow, and is intended to include not only earth but compost, manure, muck, humus, and sand and the like, adapted to support plant growth.

The expression "surface active dispersing agent" as herein employed is intended to include all agents which are capable of acting at the interfacial surface between the 4-chloro-2-nitrophenyl 4-chlorophenyl ether and water as the dispersion medium, so as to facilitate the dispersion of the ether compound in water. Thus, the term is inclusive of the solid emulsifying agents such as finely divided aluminum hydroxide and finely divided bentonite, fuller's earth, attapulgite and other clays, as well as the ionic and non-ionic wetting and emulsifying agents such as the alkaline earth metal caseinates, alkyl aryl sulfonates, sulfonated oils, complex organic ester derivatives, complex ether alcohols, and the like.

The term "finely divided inert solid" as herein employed refers to materials which are incapable of facilitating the dispersion of the water-immiscible 4-chloro-2-nitrophenyl 4-chlorophenyl ether in water as the dispersion medium and is intended to include finely divided materials such as chalk, talc, gypsum and the like.

The 4-chloro-2-nitrophenyl 4-chlorophenyl ether as employed in accordance with the present invention may be produced by known methods disclosed in "Journal of the Chemical Society," London, vol. CXXX, No. 1, pp. 1170-73 (1927).

I claim:

1. A method which comprises applying to and mixing with a growth medium a growth inhibiting amount of 4-chloro-2-nitrophenyl 4-chlorophenyl ether.

2. A method which comprises the step of contacting seeds while positioned in a growth medium with a growth inhibiting amount of 4-chloro-2-nitrophenyl 4-chlorophenyl ether.

3. A method which comprises impregnating soil with a growth inhibiting amount of 4-chloro-2-nitrophenyl 4-chlorophenyl ether.

4. A method as claimed in claim 3 wherein the 4-chloro-2-nitrophenyl 4-chlorophenyl ether is present in the amount of at least 2 parts per million parts by weight of soil.

5. An agronomical practice which comprises distributing 4-chloro-2-nitrophenyl 4-chlorophenyl ether in soil to a depth of at least 0.25 inch below the soil surface and at a substantially uniform dosage of at least 0.5 pound per acre inch of soil.

6. A method for the selective control of the germinant seeds and emerging seedlings of grasses in soil planted with broadleaf crop plants, which comprises distributing 4-chloro-2-nitrophenyl 4-chlorophenyl ether in such soil in the amount of from 2 to 120 parts by weight per million parts by weight of the soil.

7. A concentrate composition which comprises as an active toxic ingredient 4-chloro-2-nitrophenyl 4-chlorophenyl ether in admixture with a surface active dispersing agent, the active toxic ingredient being present in the amount of from 5 to 95 percent by weight.

8. A concentrate composition which comprises as an active toxic ingredient 4-chloro-2-nitrophenyl 4-chlorophenyl ether in admixture with a finely divided inert solid, the active toxic ingredient being present in the amount of from 5 to 95 percent by weight.

9. A composition for the suppression of the growth of vegetation which comprises an aqueous dispersion of the composition claimed in claim 7, the active toxic ingredient in such composition being present in a growth inhibiting concentration.

References Cited in the file of this patent

UNITED STATES PATENTS 2,054,509    Pastac _____ Sept. 15, 1936